(12) United States Patent
Puetter (10) Patent No.: US 10,504,206 B2
(45) Date of Patent: Dec. 10, 2019

(54) METHOD AND SYSTEM FOR PROCESSING IMAGES FROM A REMOTE IMAGE DETECTOR

(71) Applicant: Micro Biz Ventures LLC, San Diego, CA (US)

(72) Inventor: Richard C. Puetter, San Diego, CA (US)

(73) Assignee: Micro Biz Ventures LLC, San Diego, CA (US)

( * ) Notice: Subject to any disclaimer, the term of this patent is extended or adjusted under 35 U.S.C. 154(b) by 139 days.

(21) Appl. No.: 15/643,080

(22) Filed: Jul. 6, 2017

(65) Prior Publication Data

US 2018/0012337 A1    Jan. 11, 2018

Related U.S. Application Data

(60) Provisional application No. 62/358,925, filed on Jul. 6, 2016.

(51) Int. Cl.
*G06T 3/40* (2006.01)
*G06T 5/50* (2006.01)
*H04N 19/182* (2014.01)

(52) U.S. Cl.
CPC .............. *G06T 3/4053* (2013.01); *G06T 5/50* (2013.01); *H04N 19/182* (2014.11); *G06T 2207/10032* (2013.01); *G06T 2207/20208* (2013.01)

(58) Field of Classification Search
None
See application file for complete search history.

(56) References Cited

U.S. PATENT DOCUMENTS

| 6,353,688 | B1 * | 3/2002 | Puetter | G06T 9/00 382/205 |
| 8,306,121 | B2 * | 11/2012 | Jia | G06T 3/4053 375/240.16 |
| 2007/0018105 | A1 * | 1/2007 | Grimberg | G01J 5/22 250/349 |
| 2014/0118588 | A1 * | 5/2014 | Puetter | H04N 5/347 348/300 |

OTHER PUBLICATIONS

Pixon sub-diffraction space imaging, by Puetter et al., SPIE, Aug. 26, 2008 (Year: 2008).*

* cited by examiner

*Primary Examiner* — Vikkram Bali
(74) *Attorney, Agent, or Firm* — Eleanor Musick; Musick Davison LLP (57) ABSTRACT

A method and system for enhancing spatial resolution of an image of an object includes using an image detector with a sensor array of pixels configured for extended dynamic range detection. Multiple image sample are collected to assemble a stack of image samples and input into an image processor for processing using an image reconstruction engine to generate a single output image from the stack. In a preferred embodiment, the image reconstruction engine executes the Pixon method for image reconstruction.

20 Claims, 5 Drawing Sheets

METHOD AND SYSTEM FOR PROCESSING IMAGES FROM A REMOTE IMAGE DETECTOR

RELATED APPLICATIONS

This application claims the benefit of the priority of U.S. Provisional Application No. 62/358,925, filed Jul. 6, 2016, which is incorporated herein by reference in its entirety.

FIELD OF THE INVENTION

The present invention relates to a method and system for enhancing the quality of images obtained from a satellite or other image detector that is remotely located from the imaged object.

BACKGROUND OF THE INVENTION

The improvement of images using advanced image-processing techniques, for example, those described by Puetter et al. in "Digital Image Reconstruction: Deblurring and Denoising", *Ann. Rev. Astron. & Astrophys.*, 43, pp. 139-194 (2005), has advanced considerably over the last several decades, and such techniques are routinely applied to high-value data, such as satellite observations (Metcalf et al., 1996; Lawrence et al, 2007; Wilson et al., 2015) and astronomical surveys (Hiltner et al., 2003). There are many commercial and military applications, however, that have not yet employed advanced image-processing methods to improve their imagery. One such application is imaging of the Earth's surface from space.

Remote sensing and imaging are broad-based technologies having a number of diverse and extremely important practical applications—such as geological mapping and analysis, and meteorological forecasting. Aerial and satellite-based photography and imaging are especially useful remote imaging techniques that have, over recent years, become heavily reliant on the collection and processing of data for digital images, including spectral, spatial, elevation, and vehicle or platform location and orientation parameters. Spatial data—characterizing real estate improvements and locations, roads and highways, environmental hazards and conditions, utilities infrastructures (e.g., phone lines, pipelines), and geophysical features—can now be collected, processed, and communicated in a digital format to conveniently provide highly accurate mapping and surveillance data for various applications (e.g., dynamic GPS mapping).

Major challenges facing remote sensing and imaging applications are spatial resolution and spectral fidelity. Photographic issues, such as spherical aberrations, astigmatism, field curvature, distortion, and chromatic aberrations are well-known problems that must be dealt with in sensor/imaging applications. Certain applications require very high image resolution—often with tolerances of inches. Depending upon the particular system used (e.g., automobile, aircraft, satellite, space vehicle or platform), an actual digital imaging device may be located anywhere from several feet to miles from its target, resulting in a very large scale factor (plate scale). Providing images with very large scale factors, which also have resolution tolerances of inches, poses a challenge to even the most robust imaging system. Thus, conventional systems usually must make a trade-off between resolution quality and the size of a target area that can be imaged. If the system is designed to provide high-resolution digital images, i.e., "smaller" pixels (less solid angle per pixel), the field of view (FOV) of the imaging device is typically small. On the other hand, if the system provides a larger FOV, the system is going to employ "larger" pixels (greater solid angle per pixel) for maximum coverage, with a resulting a decrease in spatial resolution.

While imaging from high altitude and/or space is not new, and significant efforts and resources have been expended by the military for intelligence imagery, over the past few decades a new trend is the widespread use of Earth imagery collected by a number of commercial ventures. One of the newest trends is the use of very small, e.g., micro- and nano-satellites, such as "CubeSats", to obtain even more widespread and low-cost imagery. Such CubeSats are typically deployed in a "constellation" of anywhere from ten to hundreds of small satellites. Currently, a number of commercial projects are underway to provide satellite-imaging-as-a-service to the industry, governments and the general public for applications including disaster relief, agriculture, and environmental monitoring, to name a few. As with the larger military intelligence satellites, these images of Earth from space are generally limited in their spatial resolution by diffraction, and further, since the cameras in such satellites are designed to meet diffraction limits, the signal-to-noise per pixel is largely the same from application to application (the solid angle subtended by a pixel times the telescope aperture size, i.e., the system étendue, is the same in nearly all applications). What does change with telescope size from application to application, even if system étendue is the same, is the required pointing accuracy and stability. Larger diffraction-limited telescopes have pixels that subtend a much smaller angle. Consequently, pointing accuracy and stability are much more critical, especially if the detectors are scanners and not large-field, two-dimensional detectors. This is because registration of the imagery requires reliable pointing (see, for example, the discussion in Puetter and Hier 2008). These requirements are loosened with smaller telescopes since the solid angles subtended by a pixel are larger. However, the fact that smaller telescopes are generally less expensive means that they usually have less sophisticated pointing systems. Fortunately, large-field, two-dimensional arrays, which possess native geometric stability in their imagery, can help a lot. In addition, multiple images can be aligned after they are collected to construct mosaics and higher signal-to-noise ratio (SNR) stacks of images.

BRIEF SUMMARY

According to aspects of the invention, a method and system are provided for collecting imagery either from rapidly moving platforms, such as satellites imaging the ground, or of rapidly moving objects of interest, such as vehicles, aircraft, or missiles, and improving image quality by removing image blur (atmospheric, diffraction, motion, etc.) and/or reducing noise. The inventive method utilizes a combination of appropriate collection of well-sampled data and the application of advanced image processing algorithms (e.g., deconvolution, the PIXON® method, etc.). An application of particular interest is diffraction-limited, satellite imaging of the Earth, although the procedures outlined here have much wider application, and our illustration of these procedures outlined below using the satellite imaging example are not meant to be limited to this specific application.

In one aspect of the invention, a method for enhancing spatial resolution of an image of an object detected by an image detector located remotely from the object, wherein one of the object and the image detector moves relative to the other. The method includes providing within the image detector a sensor configured for extended dynamic range detection, wherein the sensor comprises an array of pixels; collecting image samples; assembling a stack of image samples; inputting the stack of image samples into an image processor; processing the stack of image samples using an image reconstruction engine; and generating an output image. In some embodiments, the image samples may be transmitted after collection for assembly (stacking) and processing at a remote site, such as a ground station. The transmission of image samples may be performed serially, e.g., as they are generated, or as one or more batches.

In certain embodiments, the pixels in the array of pixels are smaller (subtend a smaller angle) than the diffraction limit $$\left(\theta_{pixel} = 1.2 \frac{\lambda}{N \cdot D}\right),$$

where $\lambda$ is a wavelength used to acquire the image, D is a diameter of imaging optics, e.g., telescope, within the image detector, and N is an oversampling of the diffraction pattern.

In a preferred embodiment, the image reconstruction engine comprises a processor programmed to execute a PIXON® image reconstruction algorithm. The PIXON® method produces the simplest model that best fits that data, making sub-diffraction image reconstruction possible by effectively adding data to the available, detected image data.

In another aspect of the invention, an image processing system for enhancing spatial resolution of an image of an object includes: an image detector, wherein one of the object and the image detector moves relative to the other; a sensor disposed within the image detector and configured for extended dynamic range detection, wherein the sensor comprises an array of pixels configured for collecting image samples; a storage medium configured for accumulating multiple image samples to assemble a stack of image samples; an image processor configured for receiving the stack of image samples and processing the stack of image samples using an image reconstruction algorithms to produce an improved image; and a display device for displaying the improved image.

The pixels in the array of pixels are smaller than a diffraction limit, wherein the pixels subtend an angle $$\theta_{pixel} = 1.2 \frac{\lambda}{N \cdot D},$$

where $\lambda$ is a wavelength used to acquire the image, D is a diameter of imaging optics within the image detector, and N is an oversampling of a diffraction pattern. In a preferred embodiment, the image processor is programmed to execute a pixon image reconstruction algorithm.

The pixels in the array may be configured for selection in subgroups, where at least one first image sample is obtained using each pixel of the array, and at least one second image sample is obtained using one or more groups of multiple pixels, where the at least one first image sample and the at least one second image sample are included in the stack of image samples. The one or more groups of multiple pixels can be adaptively grouped according to lighting conditions and may be arranged in configurations including square, rectangular, and irregular shapes. In some embodiment, the multiple image samples are obtained from multiple, simultaneous exposures on the sensor by selecting different subgroups of pixels to generate a plurality of different resolutions in a single exposure. In other embodiments, the multiple image samples are obtained at different times and combined to generate a single output image. The image processor may be further configured to access one or more pre-existing high-resolution images of the object for addition to the stack of images.

Based on the inventor's knowledge, to date, no one is using well-sampled satellite imaging of the Earth in combination with advanced image reconstruction where either image pixels or motions between images have displacements as small as, or commensurate with, the final, desired, post-reconstruction, image resolution. The present invention is based on the concept that in order to achieve sub-diffraction resolution or resolution below the pixel sampling limit, some sort of information about the image at finer resolutions needs to be introduced. Ideally, pixel sizes should be reduced to sample this directly. But if this can't be done, then motions of one image relative to the other images with motions smaller than a pixel need to be obtained to improve the spatial resolution of the imagery beyond the diffraction limit and to reduce noise and artifacts. The closest known efforts rely on the use of shorter wavelength images to build models for longer wavelength images in an attempt to increase the spatial resolution of the longer wavelength images. An extension to this idea is using previous, high-resolution images to enhance the resolution of new imagery. But this is not what we are proposing here. We are using fine (and/or variable) sampling with adequate SNR to increase spatial resolution through direct image reconstruction. In some embodiments, information from previous imagery could also be combined as an extension to these previous techniques and the technique proposed here.

BRIEF DESCRIPTION OF THE DRAWINGS

FIGS. 3A-3C are simulated photographs of satellite images, where

DETAILED DESCRIPTION

In an exemplary embodiment, a method and system for enhancing the quality of images of, or images obtained from, moving objects combines principles of well-sampled imaging data with advanced image reconstruction algorithms to improve spatial resolution of the image. In general, the method and system are applicable in cases where there is relative movement between the location of the image detector and the object to be images. The relative movement may arise from the positioning of the image detector on a satellite (travelling at high speeds on the order of 5,000 to over 20,000 miles per hour, depending on orbit altitude), surveillance aircraft (manned or unmanned, ranging from the low 100's of miles per hour up to supersonic speeds), or other platform located at a high altitude, where the image detector is directed toward an object, either stationary, such as a building or other structure, or an object that is moving at different speed relative to that platform, such as a vehicle, a person or a living creature that may be moving or standing still, i.e., from 0 miles per hour up to around 100 miles per hour. Alternatively, the relative movement may arise where the image detector is mounted on a stationary platform and the object is moving, for example, at a relatively high speed such as an aircraft or missile (travelling at hundreds to thousands of miles per hour), or at any speed in which a vehicle, a walking or running person or animal, or other moving object. In general, the present invention is directed to improving the resolution of images in situations where the relative characteristics of the image detector and the object result in an offset that require a change in sampling. The offset may arise from relative speed differences, a large distance separation between the detector and the object, differences in ground sample distance (GSD), or some other condition that produces an offset, such as variations in detector geometry, e.g., pixel size or density.

For purposes of this description, the term "imaging platform" means a location from which an image detector collects an image. The platform may be moving or stationary. Non-limiting examples of "platforms" include space stations, orbiting spacecraft, military satellites, communications satellites, CubeSats, surveillance aircraft (airplanes and helicopters), unmanned drones, vehicles, ships, etc.

As used herein, "object" means an object that is the target of an image detector, i.e., "an object of interest", generally located at some distance from the imaging platform, i.e., "remote", such that issues such as image blur and noise from atmospheric conditions, diffraction, relative motion, and other conditions that tend to degrade the image quality can be present. The object may be moving or may be stationary.

In the example provided herein, the imaging platform is a satellite, the image detector is a telescope feeding a light sensor, and the object is located on the Earth's surface. This example is not intended to be limiting, and it will be understood by those of skill in the art that the inventive system and method are equally applicable to other imaging systems in which blur and spatial resolution are often encountered and negatively impact image quality.

Figure 1:
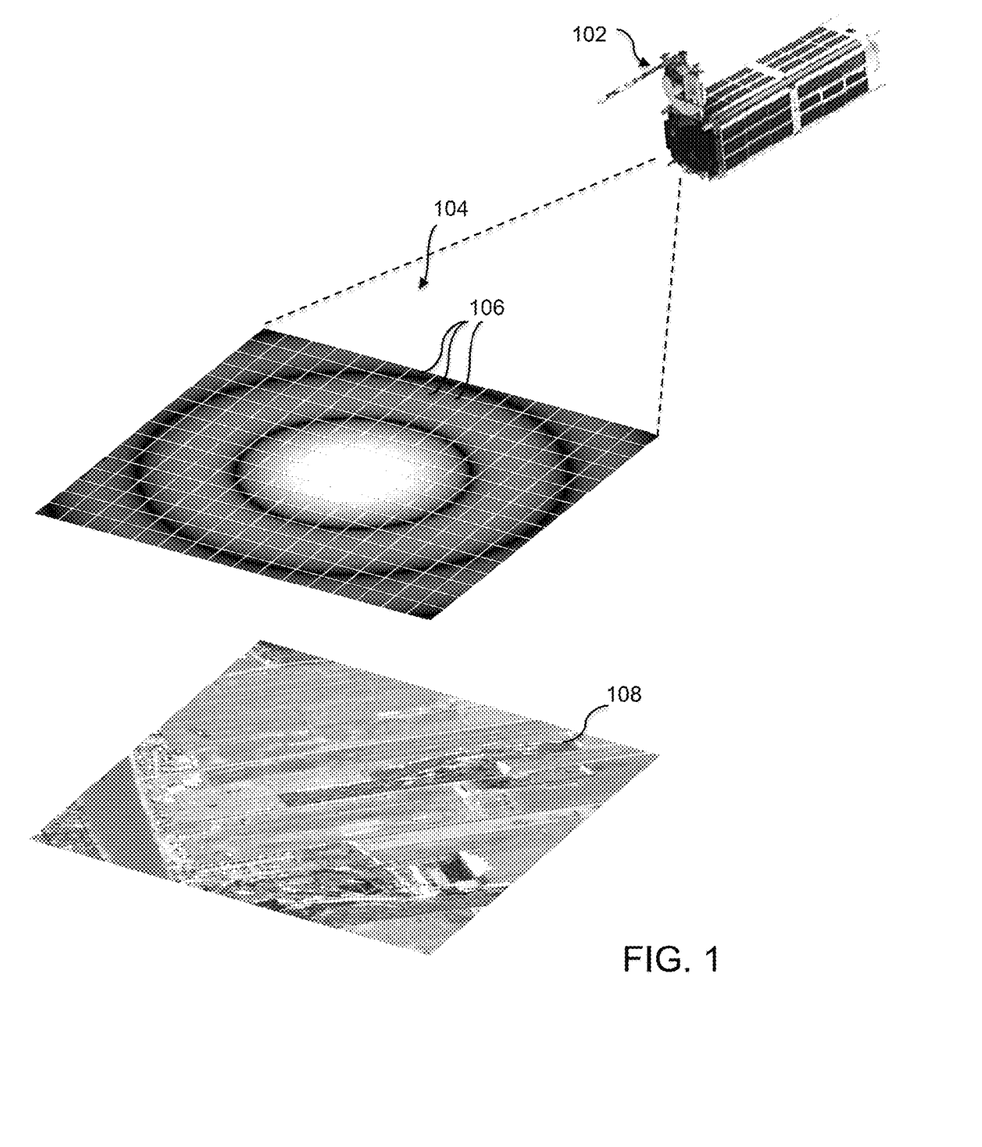
FIG. 1 is a diagrammatic view of a satellite imaging system according to an exemplary embodiment of the invention.

Referring to FIG. 1, image sensor 104 is mounted on satellite 102 and connected to appropriate processing and transmission electronics for collecting and transmitting the collected images back to a base station (not shown) located on the Earth or on an aircraft. The systems and devices for such signal collection and transmission are well known in the art and are not described in detail herein. Image sensor 104 is a two-dimensional array of pixels 106, an exemplary embodiment of which will be described below. In the illustrated example, the object 108 is an area on the Earth's surface that has some strategic (military, industrial, scientific, or commercial) interest for the system user.

Figure 2:
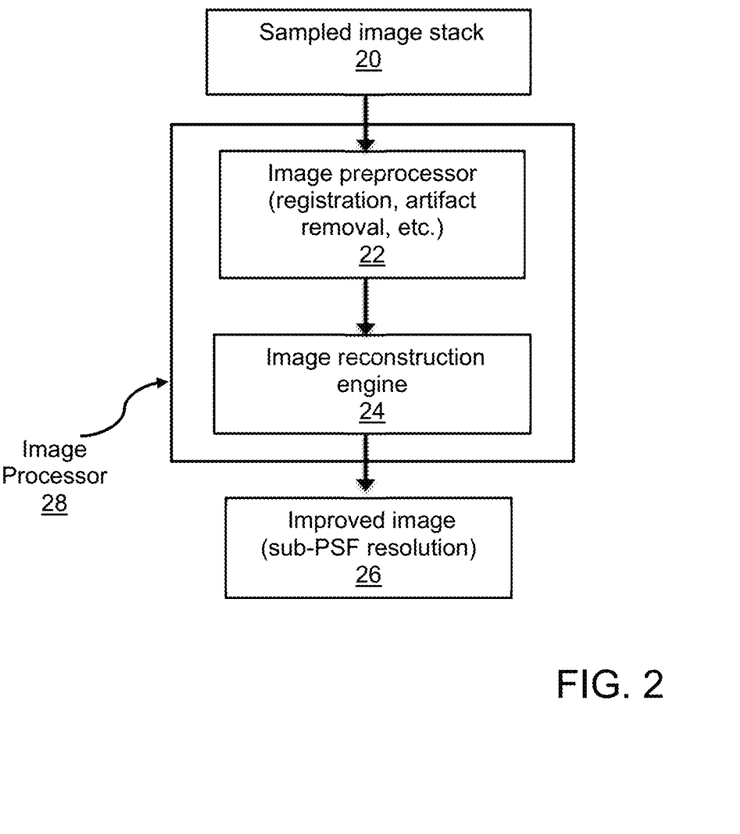
FIG. 2 is a block diagram showing process flow according to an embodiment of the invention.

FIG. 2 is a block diagram showing the steps of for image processing according to an embodiment of the invention. In step 20, image samples are collected and assembled into a stack of image samples. In step 22, the stack of image samples is input into an image processor 28 in which they are pre-processed for registration, artifact removal, and other appropriate pre-processing as is known in the art. The pre-processed image stacks are then processed using an image reconstruction engine 24 and the algorithm described in more detail below. In a preferred embodiment, the PIXON® method is used. In step 26, an improved image with sub-PSF resolution is output; and generating an output image. In some embodiments, the image samples may be transmitted after collection for assembly (stacking) and processing at a remote site, such as a ground station.

In one aspect, the inventive method combines image sampling with two-dimensional sensors with pixels smaller than the diffraction limit. Specifically, the pixels subtend a smaller angle $\theta_{pixel}$:

$$\theta_{pixel} = 1.2 \frac{\lambda}{N \cdot D}, \quad (1)$$

where $\lambda$ is the wavelength used to acquire the image, D is the diameter of the telescope (or other imaging aperture), and N is the oversampling of the diffraction pattern, with an advanced image reconstruction algorithm (e.g., the PIXON® method as described in U.S. Pat. Nos. 6,490,374, 6,895,125, 6,993,204, and 8,396,313, among others, each of which is incorporated herein by reference) to increase the spatial resolution of the imagery (e.g., if N=4, then the resulting resolution could be as much as 4 times finer than diffraction, depending on the signal-to-noise ratio, etc.) By employing the PIXON® method, the system can achieve what is effectively a sub-diffraction image reconstruction by creating the simplest model that best fits the data. In other words, through the process of producing the simplest model consistent with the data, the PIXON® method actually adds information, thus making it possible to introduce structure that may not have been detected by the sensor, or may have been lost due to noise or blur. (See, e.g., U.S. Pat. No. 8,396,313, in which the PIXON® method is applied to restore image data that may have been lost in an image compression process.)

The use of relatively short exposures that freeze the object (or platform) in motion, nearly freeze this motion, or give rise to a known or measurable motion blur, significantly reduces the need for a highly sophisticated, accurate, and stable telescope pointing system. The collected images may be registered and stacked after collection to generate mosaics and higher-SNR images.

In one embodiment, the two-dimensional sensors used for image sampling have an extended dynamic range to enable variable spatial sampling and provide improved signal-to-noise ratio (SNR) in darker portions of the image. In a particularly preferred embodiment, the sensors incorporate the dynamic range-extending capabilities disclosed in U.S. Pat. No. 8,786,732, which is incorporated herein by reference. Briefly, the sensor, referred to as the "ExDRA" sensor, provides extended dynamic range capability by employing adaptive binning on-chip and off-chip to enhance target detectability under low light and ultra-low light conditions. In such applications, the ExDRA sensor can be particularly useful in tailoring image sampling, allowing the use of smaller pixels to produce higher reconstructed image resolution in bright regions than would otherwise be permitted in a sensor designed for general-purpose imaging. A key advantage of this approach is that an ExDRA sensor suffers no SNR penalty for a camera design that uses pixels that are too small for the majority of the imagery. The ExDRA sensor is able to detect (or receive detection information) and adapt to the particular lighting by grouping the pixels as needed. This approach of using a configurable sensor is not known within conventional satellite sensor designs, due at least in part to the fact that albedo, especially high albedo (~0.9), is generally not considered an important factor. Rather, the goal is to achieve the largest possible field of view of regions on more typical and modest albedo.

In some configurations of the ExDRA sensor, the pixels of a charge-coupled detector (CCD) may be grouped into sections. One example is a 4×4 pixel grouping, however, any number of configurations may be used of regular, e.g., square or rectangular, and irregular shapes. By separately accessing the signals collected at each pixel, different combinations of pixels may be used to generate signals under variable lighting conditions. Using the pixel groups, two images (or more) can be created during the same exposure period by using two different effective light collection areas. For example, a subset, e.g., one or more pixels within each group, may be used to generate a signal representing areas of the imaged object or scene that are under better lighting conditions, while a larger number of pixels can be used to generate a signal representing areas that are poorly lit. The simultaneous exposure generates two images (or more) with the same exposure time, but with two different effective light collection areas as the two images have different spatial resolutions. Using the above example, the two images are generated by the light collection areas of (1) a single pixel, the high spatial resolution image, and (2) the summed signal (in the charge or digital domain) of the 4×4 pixel group, the "super-pixel", forming the low-resolution image.

In another configuration, an image sensor may be a pixel array having a plurality of pixel regions, in which the pixel array is adapted to generate at least one signal from each pixel region and a separate signal from a subset of pixels within each pixel region, both during a single exposure period. In one embodiment, the sensor is in communication with a shift register that accumulates the separate signal and transfers the separate signal to an amplifier. The shift register further accumulates at least one signal from the pixel region after the separate signal has been transferred to the amplifier.

In still another configuration, an image sensor includes a plurality of super-pixels, each a super-pixel containing an array of pixels, each pixel adapted to generate a charge upon exposure to light, wherein the super-pixel has defined therein a subset of pixels comprising one or more pixels; at least one first shift register in communication with the super-pixel for receiving charges generated by the pixels; at least one second shift register in communication with the first shift register, wherein the at least one second shift register is adapted to separately transfer a first signal generated by the subset of pixels and a second signal generated by remaining pixels of the super-pixel; and an amplifier for collecting the charges from the at least one second shift register, wherein the amplifier is adapted to collect the first signal to define a low sensitivity image and the second signal, to combine the first signal and second signal to define a high sensitivity image, and to generate an output comprising the combined first signals and second signals from each of the plurality of super-pixels for one or more exposure periods.

The ExDRA approach of charge-domain binning is equally applicable to CMOS and CCD sensors. For use with CMOS and similar sensors, the first read out produces a high-resolution picture, which would correspond to the "normal" exposure. Next, the charges are shifted from groupings of multiple pixels to a single output amplifier to generate the low-resolution image. This process can be performed multiple times to generate more than two images and more than two distinct resolutions. As applied to the present invention, the multiple (two or more) images are included in the image stack for use in image reconstruction.

The ExDRA sensor architecture may take multiple, simultaneous exposures on the same sensor with different sets of dispersed sensors (multiplex in space). This dramatically reduces the pixel count, but dramatically increases sensitivity and dynamic range by combining pixels before readout to form multiple images with different resolutions in the same exposure. In yet another embodiment, both temporal and spatial multiplexing may be used to form customized combinations of high-sensitivity and resolution images to combine into a high-dynamic-range image.

In general, sensors with larger values of N (oversampling of the diffraction pattern) would be advantageous because the approaches described in the '732 patent could recombine them at readout to obtain lower effective values of N.

In certain embodiments, smart versions of the sensor could have variable, not-square (or non-rectangular) ExDRA-style binning of pixels to achieve even more optimal sampling versus SNR tradeoffs.

Figure 3A:
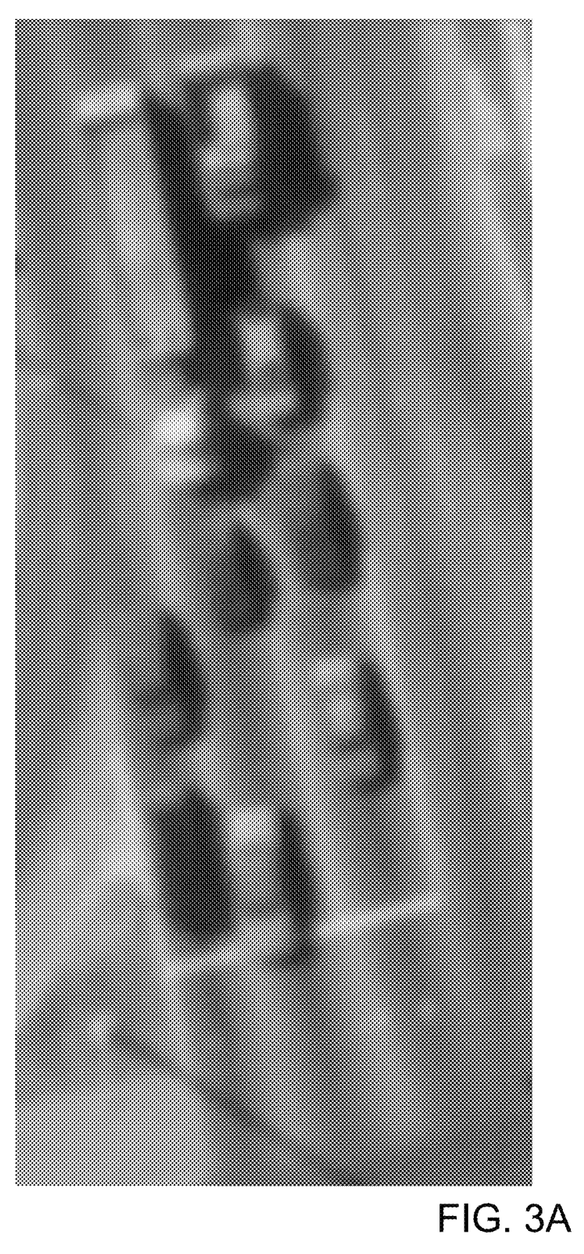
FIG. 3A shows simulated data as collected.
Figure 3B:
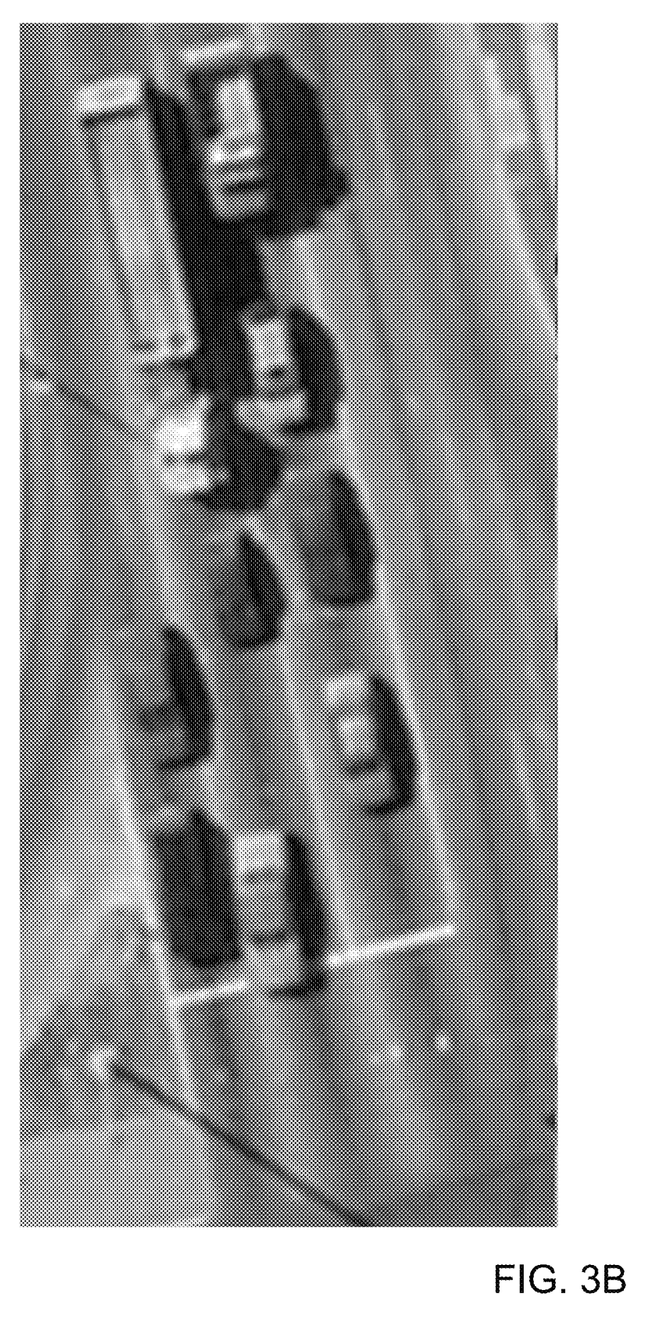
FIG. 3B shows the results of image reconstruction using the PIXON method.
Figure 3C:
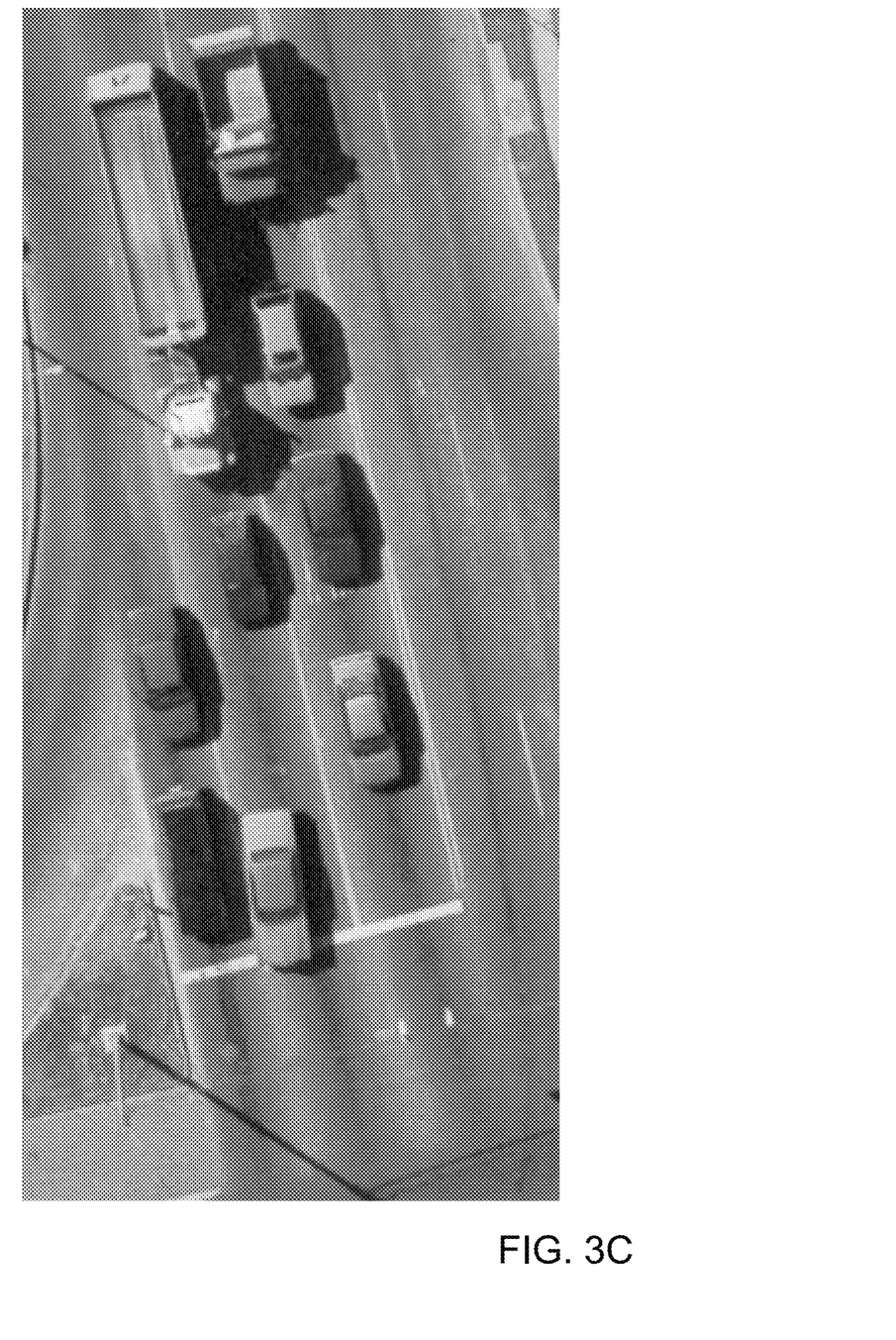
FIG. 3C shows results obtained using processing according to an embodiment of the invention

FIGS. 3A-3C illustrate an exemplary reconstruction of an image corresponding to a simulated data set that is representative of an image that would be produced via satellite Earth imaging. FIG. 3A is the simulated collected data showing an overhead image of a roadway intersection with traffic. FIG. 3C is the truth image, which has 6× the resolution of the data. To generate the data for FIG. 3A, the truth image was diffraction limited with a PRF (Point Response Function) given by an Airy function sampled with square pixels with 6 pixels across the FWHM of the Airy PSF (Point Spread Function). The peak SNR (Signal to Noise Ratio) per pixel of the data is 200. Under visual inspection, the objects in the image are blurred, but sufficiently clear enough to allow certain features to be extracted.

FIG. 3B shows the results of reconstruction of the data from FIG. 3A using the PIXON® method according to an embodiment the invention. The formal boost in resolution exceeds 4× the resolution of the diffraction-limited data seen in FIG. 3A. The median resolution boost is about 3× finer than the data, falling approximately half-way between the data and the original truth image. Larger resolution boosts can be achieved with even finer sampling, or more images at dithered positions, but pragmatically, systematic errors eventually limit resolution gains.

The method and system described herein provide for enhanced spatial resolution of an image of an object detected by an image detector mounted on a platform where one of the object and the image detector is moving at a higher rate of speed relative to the other. The system is based on a sensor configured for extended dynamic range detection, where the sensor consists of an array of pixels that is configured for adaptive binning. The sensor collects multiple images of the same target under different binning parameters to generate a stack of image samples. This image stack is input into an image processor and processed using an image reconstruction algorithm. The resulting output image exhibit significantly improved resolution.

REFERENCES (Incorporated Herein by Reference)

1. Puetter, R. C., Gosnell, T. R., and Yahil, A., "Digital Image Reconstruction: Deblurring and Denoising", *Ann. Rev. Astron. & Astrophys.*, 43, pp. 139-194 (2005).
2. Metcalf, T. R. et al., "Pixon-based Multiresolution Image Reconstruction for Yohkoh's Hard X-Ray Telescope", *Astro. Phys. J.*, 466, pp. 585-594 (1996).
3. Lawrence, D. J. et al., "Global Spatial Deconvolution of Lunar Prospector Th Abundances", *Geophys. Res. Let.*, 34, pp. L03201-L03206 (2007).
4. Wilson, J. T., et al., "Tests of GCM Pressure Predictions for Water Ice Stability Using Mars Odyssey Neutron Spectrometer Data", *EPSC Abstracts*, 10, pp. 580-581 (2015).

5. Hiltner, P. R. et al., "Restoration of Digitized Astronomical Plates with the Pixon Method, *Astronomical Data Analysis Software and Systems XII ASP Conference Series*, 295, H. E. Payne, R. I. Jedrzejewski, and R. N. Hook, eds., p. 407 (2003).

6. Puetter, R. C., and Hier, R. G., "Pixon Sub-Diffraction Space Imaging", *Proc. SPIE* 7094, *Unconventional Imaging IV*, 709405 (26 Aug. 2008).

The invention claimed is:

1. A method for enhancing spatial resolution of an image of an object detected by an image detector located remotely from the object, wherein one of the object and the image detector moves relative to the other, the method comprising:
providing within the image detector a sensor comprising an array of pixels at least a portion of which are smaller than a diffraction limit, wherein each smaller pixel of the portion of smaller pixels subtends an angle $$\theta_{pixel} = 1.2 \frac{\lambda}{N \cdot D},$$

where $\lambda$ is a wavelength used to acquire the image, D is a diameter of imaging optics within the image detector, and N is an oversampling of a diffraction pattern and is greater than 1;
collecting multiple image samples;
assembling a stack of image samples;
inputting the stack of image samples into an image processor;
processing the stack of images using an image reconstruction engine; and
generating an output image.

2. The method of claim 1, wherein the image reconstruction engine comprises a processor programmed to execute a Pixon image reconstruction algorithm.

3. The method of claim 1, wherein the pixels in the array are selectable in subgroups, wherein at least one first image sample is obtained using each pixel of the array, and at least one second image sample is obtained using one or more groups of multiple pixels, wherein the at least one first image sample and the at least one second image sample are included in the stack of image samples.

4. The method of claim 3, wherein the one or more groups of multiple pixels are adaptively grouped according to lighting conditions.

5. The method of claim 3, wherein the one or more groups of pixels are arranged in configurations including square, rectangular, and irregular shapes.

6. The method of claim 1, wherein the multiple image samples are obtained from multiple, simultaneous exposures on the sensor by selecting different subgroups of pixels to generate a plurality of different resolutions in a single exposure.

7. The method of claim 1, wherein the multiple image samples are obtained at different times.

8. The method of claim 1, further comprising, prior to processing the stack of images, accessing and adding a pre-existing high-resolution image of the object to the stack of images.

9. The method of claim 1, wherein the image detector is mounted on a spacecraft, satellite or surveillance aircraft and the object is located on the Earth's surface.

10. The method of claim 1, wherein the sensor is configured for adaptive binning to enable extended dynamic range detection.

11. An image processing system for enhancing spatial resolution of an image of an object, the system comprising:
an image detector, wherein one of the object and the image detector is remotely located and moves relative to the other;
a sensor disposed within the image detector, the sensor comprising an array of pixels configured for collecting image samples, wherein at least a portion of the array of pixels are smaller than a diffraction limit, wherein each smaller pixel of the portion of smaller pixels subtends an angle $$\theta_{pixel} = 1.2 \frac{\lambda}{N \cdot D},$$

where $\lambda$ is a wavelength used to acquire the image, D is a diameter of imaging optics within the image detector, and N is an oversampling of a diffraction pattern and is greater than 1;
a storage medium configured for accumulating multiple image samples to assemble a stack of image samples;
an image processor configured for receiving the stack of image samples and processing the stack of image samples using an image reconstruction algorithm to produce an improved image; and
a display device for displaying the improved image.

12. The system of claim 11, wherein the image processor is programmed to execute a pixon image reconstruction algorithm.

13. The system of claim 11, wherein the pixels in the array are configured for selection in subgroups, wherein at least one first image sample is obtained using each pixel of the array, and at least one second image sample is obtained using one or more groups of multiple pixels, wherein the at least one first image sample and the at least one second image sample are included in the stack of image samples.

14. The system of claim 13, wherein the one or more groups of multiple pixels are adaptively grouped according to lighting conditions.

15. The system of claim 13, wherein the one or more groups of pixels are arranged in configurations including square, rectangular, and irregular shapes.

16. The system of claim 11, wherein the multiple image samples are obtained from multiple, simultaneous exposures on the sensor by selecting different subgroups of pixels to generate a plurality of different resolutions in a single exposure.

17. The system of claim 11, wherein the multiple image samples are obtained at different times and combined to generate a single output image.

18. The system of claim 11, wherein the image processor is further configured to access one or more pre-existing high-resolution images of the object and add the one or more pre-existing images to the stack of images for processing.

19. The system of claim 11, wherein the image detector is mounted on a spacecraft, satellite or surveillance aircraft, and the object is located on the Earth's surface.

20. The system of claim 11, wherein the sensor is configured for adaptive binning to enable extended dynamic range detection.

* * * * *